United States Patent
Wang

(10) Patent No.: US 7,530,035 B2
(45) Date of Patent: May 5, 2009

(54) AUTOMATIC POWER GRID SYNTHESIS METHOD AND COMPUTER READABLE RECORDING MEDIUM FOR STORING PROGRAM THEREOF

(75) Inventor: Jyh-Herng Wang, Cyonglin Township, Hsinchu County (TW)

(73) Assignee: Faraday Technology Corp., Science-Based Industrial Park, Hsin-Chu (TW)

( * ) Notice: Subject to any disclaimer, the term of this patent is extended or adjusted under 35 U.S.C. 154(b) by 327 days.

(21) Appl. No.: 11/212,295

(22) Filed: Aug. 25, 2005

(65) Prior Publication Data

US 2007/0050747 A1 Mar. 1, 2007

(51) Int. Cl.
*G06F 17/50* (2006.01)
(52) U.S. Cl. .............. 716/2; 716/7; 716/12; 716/18
(58) Field of Classification Search ............ 716/7, 716/12; 703/14, 18
See application file for complete search history.

(56) References Cited

U.S. PATENT DOCUMENTS 6,976,235 B2 * 12/2005 Bobba et al. ............. 716/7
2006/0095870 A1 * 5/2006 Tai et al. .................. 716/1

* cited by examiner

*Primary Examiner*—Vuthe Siek
*Assistant Examiner*—Aric Lin
(74) *Attorney, Agent, or Firm*—Winston Hsu

(57) ABSTRACT

An automatic power grid synthesis method and a computer readable recording medium for storing a program thereof for synthesizing power grid in a circuit area are provided. The circuit area has at least one power consuming module therein and at least one power pin disposed around the circuit area. The method includes the following steps. First, select at least one representative point in each power consuming module. The circuit area is divided into a plurality of regions according to the positions of the representative point(s) and the power pin. An overall power grid density of each region is calculated in accordance with the position of each power pin and the power consumption or current requirement at each representative point. Finally, the power grid synthesis is performed in each region according to the corresponding overall power grid density of the region.

15 Claims, 4 Drawing Sheets

AUTOMATIC POWER GRID SYNTHESIS METHOD AND COMPUTER READABLE RECORDING MEDIUM FOR STORING PROGRAM THEREOF

BACKGROUND OF THE INVENTION

1. Field of Invention

The present invention relates to an Electronic Design Automation (EDA) method. More particularly, the present invention relates to an automatic power grid synthesis method and a computer readable recording medium for storing a program thereof.

2. Description of Related Art

The electronic industry develops rapidly with the assistance of computer science. For example, Electronic Design Automation (EDA) makes use of the operation ability to aid the design and simulate the electronic circuit for research engineers. Especially, the integrated circuit research needs various automatic tools to aid such work as function tests, synthesis, line layout, electronic analysis and simulation. Additionally, as the trend of the circuit densification and the timing requirement of product launches in the market, it is an important subject for how to research & develop the most economically beneficial chip products within a shortest period of time.

In circuit designing process, the specification of the power line (power grid) and the disposed position must be laid out in order to supply enough power for all the power consumption modules & devices. For a long time, all the power grid forming tools apply design-independent rule-based design method (whatever for power ring/line or power net). The method includes the following steps: (1) form the power grid in accordance with some internal rules; (2) then, verify the quality of the formed power grid or net by rail analysis tool. If the testing result can not meet the required specification, then (3) find out the hot spot (namely, the weakness point) and strengthen it.

However, power grid will occupy the line layout resource, so that, in some circuits, the chip area must be enlarged to meet the voltage drop specification between the power pin and the internal circuit without affecting the common signal circuit line layout, which increases the manufacturing cost. Therefore, in the precondition of meeting the voltage drop specification between the power pin and the internal circuit, the smaller the area of the power grid, the better. The disadvantages of the current known method for forming the power grid include: (1) the methods can only find out the weakness point(s) of the formed power grid, but can not simplify the power grid area of the small power consumption area; (2) the method first forms the power grid or net in accordance with manually decided specification; then finds out the weakness point(s) by verification and manually enlarges the power grid dimension of the power grid; such repeating operation prolongs the circuit design processing cycle; (3) the known method of forming power grid is design-independent, which applies the common power grid architecture on all the circuit design configurations, that it can not suit the design requirement.

SUMMARY OF THE INVENTION

Accordingly, the present invention is directed to provide an automatic power grid synthesis method for synthesizing the power grid which only occupies necessary area in accordance with design and floor plan design.

The present invention is also directed to provide an automatic power grid synthesis method and a computer readable recording medium for storing a program thereof.

The present prevention provides an automatic power grid synthesis method for synthesizing power grid in a circuit area. Wherein, the circuit area has at least one power consuming module and at least one power pin. The method for synthesizing power grid includes the following steps. First, select at least one representative point in the power consuming modules. The circuit area is divided into a plurality of regions in accordance with the position(s) of the representative point(s) and the power pin. An overall power grid density of each region is calculated in accordance with the position of each power pin and the power consumption or current requirement at each representative point. Finally, the power grid synthesis is performed in each region according to the power grid density of the region.

The prevent invention also provides a computer readable recording medium for storing a program thereof. The program is used for synthesizing power grid in circuit area. Wherein, the circuit area includes at least one power consuming module and at least one power pin. The program comprises the following sets of instructions: read the chip file which at least includes a circuit area, a power consuming module and a power pin; select at least one representative point in the power consuming module; divide the circuit area into a plurality of regions according to the positions of the representative point(s) and the power pin(s); calculate the power grid density of each region in accordance with each power pin and each representative point; and perform synthesizing the power grid in each region in accordance with the power grid density of the region.

The present invention divides the circuit area into a plurality of regions and further calculates the overall power grid density of the each region, so that the power grid can be synthesized in accordance with the corresponding overall power grid density of the region. Therefore, the power grid with only necessary area can be synthesized in accordance with design and floor plan.

In order to the make the aforementioned and other objects, features and advantages of the present invention comprehensible, a preferred embodiment accompanied with figures is described in detail below.

DESCRIPTION OF EMBODIMENTS

Figure 1:
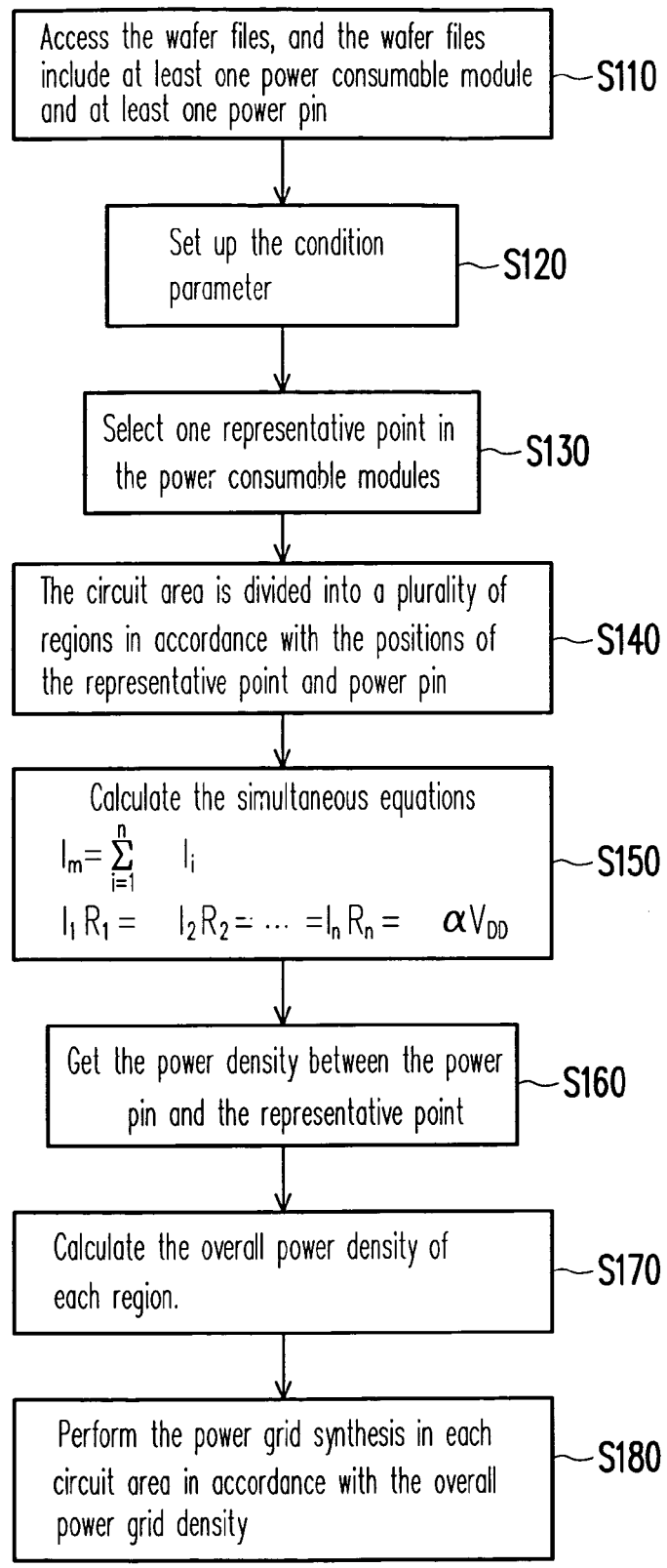
FIG. 1 is a flow chart of an automatic power grid synthesis method according to the preferred embodiment of the prevent invention.

FIG. 1 is a flow chart of an automatic power grid synthesis method for synthesizing power grid in a circuit area. Referring to FIG. 1, first access the chip file in step S110. The chip file, for example, describes the floor plan of the target integrated circuit, wherein the circuit area in the target integrated circuit includes at least one power consuming module and at least one power pin.

Figure 2:
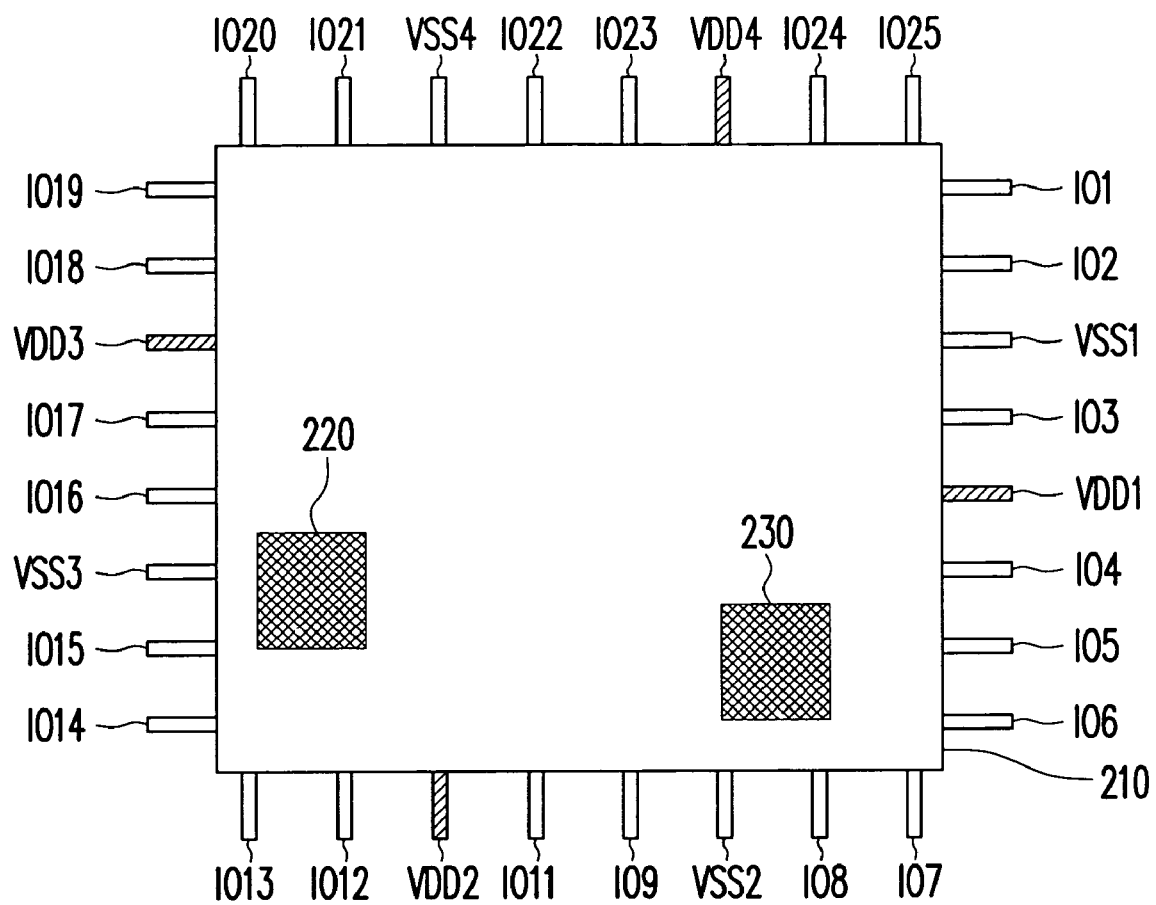
FIG. 2 is a floor plan of an integrated circuit according to the preferred embodiment of the prevent invention.

To simplify the explanation, the embodiment will be exemplified as peripheral I/O integrated circuit 200 in FIG. 2; however, the present invention is not limited to it. FIG. 2 is the floor plan of an integrated circuit according to the preferred embodiment of the prevent invention. In general, a plurality of IO cells, ground pins and power pins are disposed around the circuit area in the peripheral I/O integrated circuit design; and a plurality of circuit modules and logic cells (namely "power consuming modules" here) are disposed in the circuit area. In FIG. 2, only IO cells IO1~IO25 ground pins VSS1~VSS4 and power pins VDD1~VDD4 represent the common IO cells, ground pins and power pins in the common integrated circuit; and the circuit area 210 represents the common circuit area in the common integrated circuit. Additionally, the circuit area 210 in FIG. 2 does not show all the circuit modules and logic cells, but just the power consuming modules 220 and 230 as representations to illustrate the embodiment of the present invention more clearly. Those skilled in the art can analogically extend the present invention to other types of integrated circuit design without departing from the scope or spirit of the invention.

Returning to FIG. 1, in step S120, designer determines the condition parameter according to the specification needed. Next, select at least one representative point in power consuming module (step S130). In the embodiment, the representative point, for example, is the center point of the power consuming module. Additionally, the representative point may also be the most power consuming position or any point in the power consuming module.

Figure 3A:
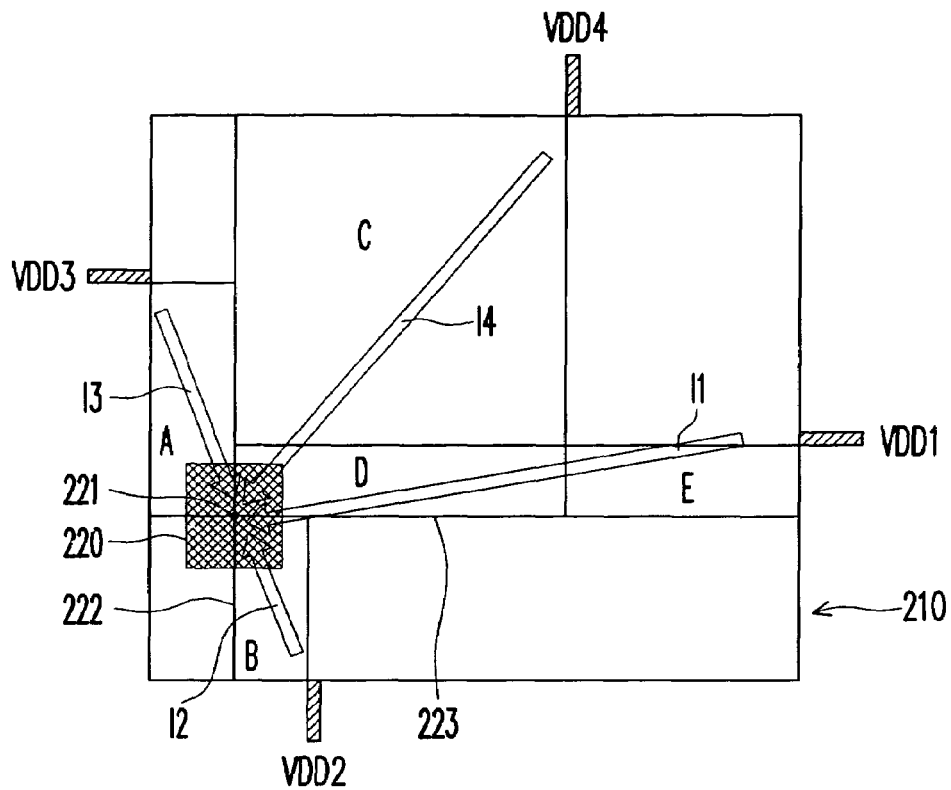
FIG. 3A and FIG. 3B are schematic diagrams of the divided region when only considering one power consuming module in FIG. 2 respectively.
Figure 3B:
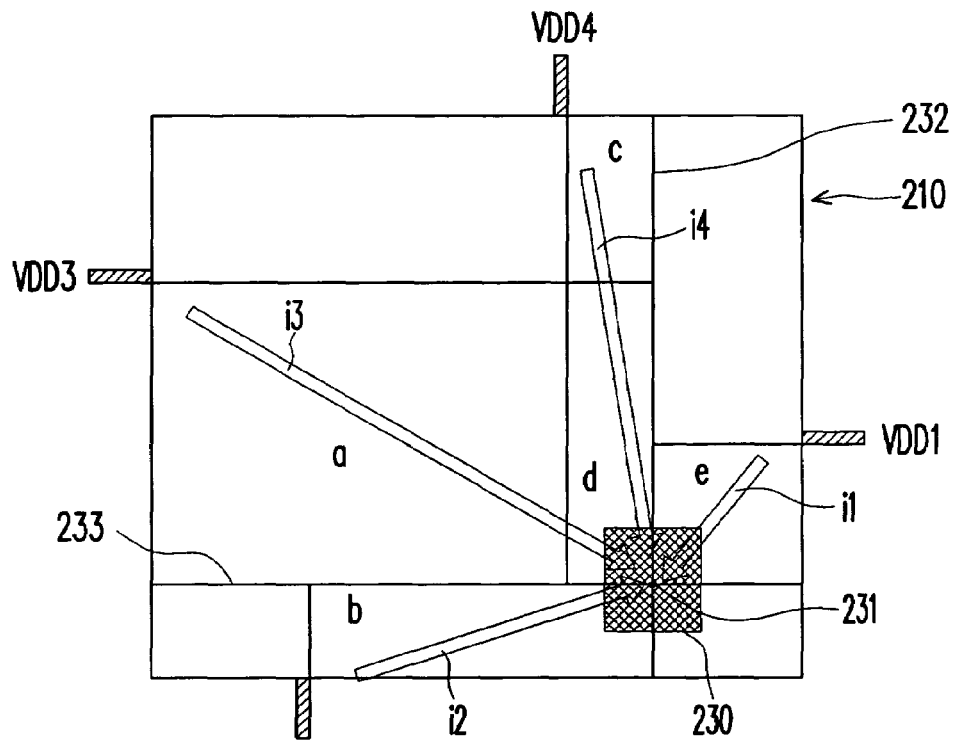

In step S140, the circuit area is divided into a plurality of regions in accordance with the positions of the representative point(s) and the power pin(s). Next, perform steps S150 to S160 to calculate the power grid density of each power pin to each representative point. FIG. 2 is re-drawn in FIGS. 3A and 3B, wherein FIG. 3A is a schematic diagram of the divided region when only considering the power consuming module 220 in FIG. 2, and FIG. 3B is a schematic diagram of the divided region when only considering the power consuming module 230 in FIG. 2. In order to explain the embodiment in brief, only the power pins VDD1-VDD4 are shown in FIG. 3A and FIG. 3B, and the other pins are omitted.

In FIG. 3A, the center point of the selected power consuming module 220 is the representative point 221. Using the representative point 221 as the origin point, draw the perpendicular axis 222 and the horizontal axis 223 along perpendicular direction and horizontal direction respectively. Next, draw a straight line in accordance with perpendicular direction or horizontal direction respectively from the power pins VDD1-VDD4, which crosses with the perpendicular axis 222 or the horizontal axis 223. At the same time, the circuit area 210 has been divided into regions A-E.

If Im is the overall consumed current of the power consuming module 220, and i1-i4 are the currents through the 1st power pin VDD1 to the 4th power pin VDD4 respectively, then calculate the calculating simultaneous equations:

$$I_m = \sum_{j=1}^{n} I_j, \text{ and}$$

$$I_1 R_1 = I_2 R_2 = I_3 R_3 = I_4 R_4 = \alpha_1 V_{DD}.$$

Wherein, R1-R4 are the resistances of the current path between the 1st power pin to the 4th power pin and the representative point 221, that is: R1 is the resistance of the region D+E; R2 is the resistance of the region B; R3 is the resistance of the region A; R4 is the resistance of the region C+D. VDD is the voltage at the power pin VDD1-VDD4, and α1 is the permitted power voltage drop quotiety of the power consuming module 220. For example, if the voltage VDD of the power pins VDD1-VDD4 is 5V, and the permitted power voltage falls down to the lowest to 4.75V, the power voltage drop quotiety α1 of the power consuming module 220 equals 5%.

Usually, there have unlimited sets of solutions of the above calculating simultaneous equations. In the embodiment, for example, perform linear layout and select one set of solutions according to the program condition and apply the condition parameters determined in step S120, so that to get the value of the current $I_1$-$I_4$ through the power pins VDD1-VDD4. Those skilled in the art can get one set of the solutions of the above calculating simultaneous equations by other mathematic method, and the scope of the present invention should not be limited by the embodiment. When the solution is selected, the resistance between each power pin and the representative point can be determined. Next, calculate the resistance between each power pin and the representative point to get the power grid density of the region between each power pin and the representative point. In the embodiment, the power grid density is, for example, the reciprocal of the resistance between each power pin and the representative point. Therefore, the power grid density $D_1$-$D_4$ of the region between the power pins VDD1-VDD4 and the representative point 221 can be derived from the following equations respectively:

$$D_1 = \frac{1}{R_1} = \frac{I_1}{\alpha_1 V_{DD}}$$

$$D_2 = \frac{1}{R_2} = \frac{I_2}{\alpha_1 V_{DD}}$$

$$D_3 = \frac{1}{R_3} = \frac{I_3}{\alpha_1 V_{DD}}$$

$$D_4 = \frac{1}{R_4} = \frac{I_4}{\alpha_1 V_{DD}}.$$

That is, the power grid density of the region A, B, C, E is $D_3$, $D_2$, $D_4$ and $D_1$. In the embodiment, as the region D is shared by power pin VDD1 and VDD4, the power grid density of region D can be obtained from $D_1$ and $D_4$ (that is, more power wire area may be supplied in the region D).

Similarly, perform the power grid density analysis for the power consuming module 230 in FIG. 2 by the same way. In FIG. 3B, the center point of the selected power consuming module 230 is selected as the representative point 231. Using the representative point 231 as the origin point, draw the perpendicular axis 232 and the horizontal axis 233 along perpendicular direction and horizontal direction respectively. Next, draw a straight line according to perpendicular direction or horizontal direction from the power pins VDD1-VDD4 respectively, which crosses with the perpendicular axis 232 or the horizontal axis 233. At the same time, the circuit area 210 has been divided into regions a-e.

If $i_m$ is the overall consumed current of the power consuming module 230, and $i_1$-$i_4$ are the currents through the $1^{st}$ power pin VDD1 to the $4^{th}$ power pin VDD4 respectively, calculate the following simultaneous equations:

$$i_m = \sum_{j=1}^{n} i_j, \text{ and}$$

$$i_1 r_1 = i_2 r_2 = i_3 r_3 = i_4 r_4 = \alpha_2 V_{DD}.$$

Wherein, $r_1$-$r_4$ are the resistances of the current path between the $1^{st}$ power pin VDD1 to the $4^{th}$ power pin VDD4 and the representative point 231, that is: $r_1$ is the resistance of the region e; $r_2$ is the resistance of the region b; $r_3$ is the resistance of the region a+d; and $r_4$ is the resistance of the region c+d. $V_{DD}$ is the voltage of the power pins VDD1-VDD4, and $\alpha_2$ is the permitted power voltage drop quotiety of the power consuming module 230. For example, if the voltage $V_{DD}$ of the power pins VDD1-VDD4 is 5V, and the permitted power voltage of the power consuming module 230 falls down to the lowest to 4.75V, then the power voltage drop quotiety $\alpha_2$ of the power consuming module 230 equals 5%.

Usually, there are unlimited sets of solutions for the calculating simultaneous equations of the power consumable module 230. Here, for example, perform linear layout and select one set of solutions of the calculating simultaneous equations according to the program condition and applying the condition parameters determined in step S120, so that to get the value of the current i1-i4 through the power pin VDD1-VDD4. Of course, those skilled in the art can get one set of the solutions of the above calculating simultaneous equations by other mathematic method.

When the solution of the calculating simultaneous equations is selected, the resistance between each power pin and the representative point 231 can be determined. In the embodiment, the power grid density is, for example, the reciprocal of the resistance between each power pin and the representative point 231. Therefore, the power grid density $d_1$-$d_4$ of the regions between the power pins VDD1-VDD4 and the representative point 231 can be derived from the following equations respectively:

$$d_1 = \frac{1}{r_1} = \frac{i_1}{\alpha_2 V_{DD}}$$

$$d_2 = \frac{1}{r_2} = \frac{i_2}{\alpha_2 V_{DD}}$$

$$d_3 = \frac{1}{r_3} = \frac{i_3}{\alpha_2 V_{DD}}$$

$$d_4 = \frac{1}{r_4} = \frac{I_4}{\alpha_2 V_{DD}}.$$

That is, the power grid density of the region a, b, c, e is $d_3$, $d_2$, $d_4$ and $d_1$ respectively. In the embodiment, as the region d is shared by power pin VDD3 and VDD4, the power grid density of region d can be obtained from $d_3$ and $d_4$.

Figure 4:
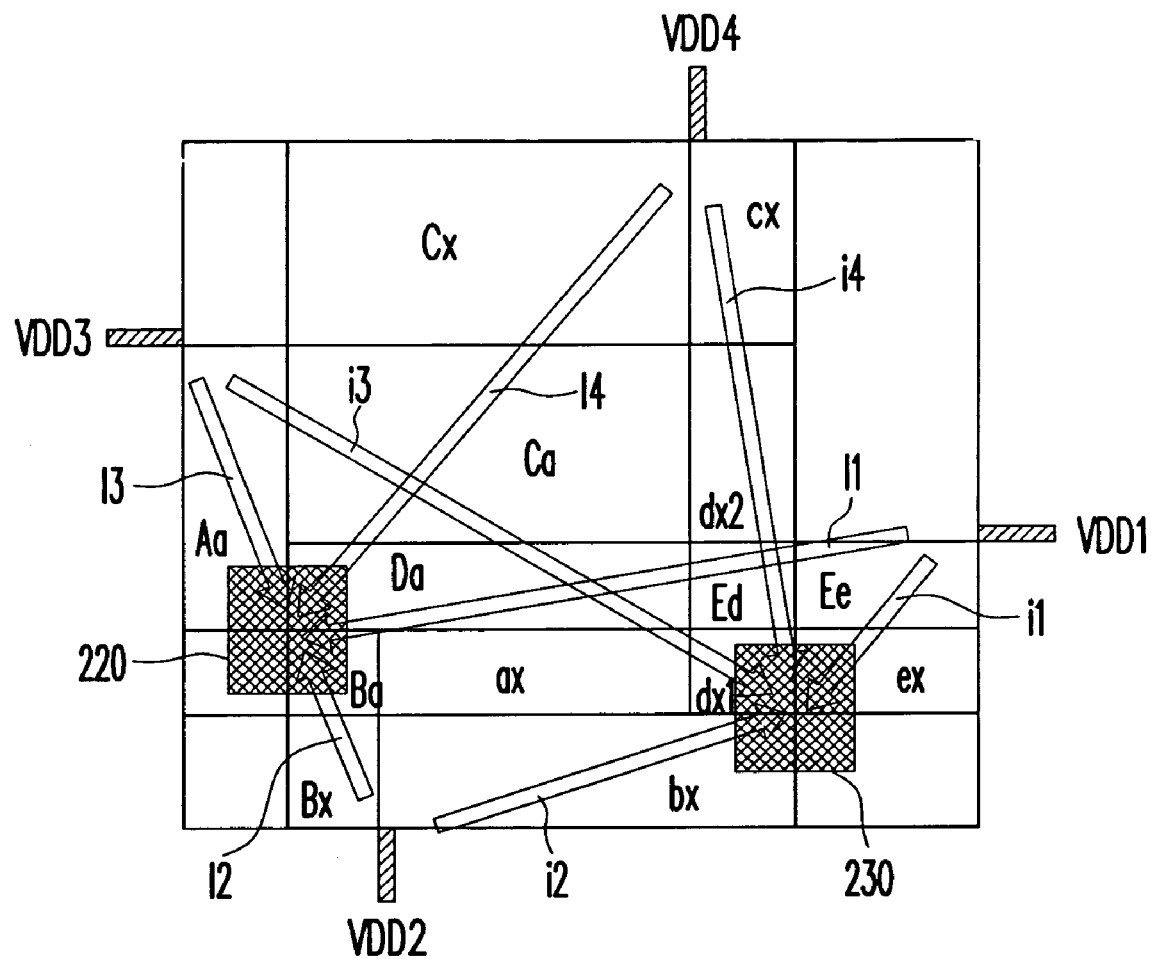
FIG. 4 is a re-drawn diagram of the divided region and power consuming module in FIGS. 3A and 3B.

Next, as shown in FIG. 4, overlay the regions divided in FIG. 3A and FIG. 3B together, and form the region Aa-ex. FIG. 4 re-draws the regions and the power consuming modules divided in FIG. 3A and FIG. 3B. Referring to the FIG. 2 and FIG. 4 simultaneously, in step S170, select one of the regions one by one, then calculate the power grid density between each power pin through the selected region and each representative point, so that to get an overall power grid density of the selected region. For example, in FIG. 4, first select region Aa, as the currents I3 and i3 from the power pin VDD3 for power consuming modules 220 and 230 respectively all pass the region Aa, at the same time, the region Aa is also formed by overlaying the region A in FIG. 3A and region a in FIG. 3B, so that to get the overall power grid density of region Aa by D3 and d3.

Next, select the next region, for example, select the region Bx. As only the power pin VDD2 can supply the current $I_2$ through the selected region Bx for the power consuming module 220, the overall power grid density of the region Bx equals $D_2$. According to this, select region Ba, ax, bx, dx1, Da, Ca, Cx, cx, dx2, Ed, Ee and ex one by one, then calculate the power grid density $D_2$, $d_3$, $d_2$, ($D_3$, $d_4$), ($D_1$, $D_4$, $d_3$), ($D_4$, $d_3$), $D_4$, $d_4$, ($d_3$, $d_4$), ($D_1$, $d_3$, $d_4$), ($D_1$, $d_1$) and $d_1$ of each module and get the overall power grid density of the regions respectively.

Next perform step S180: synthesizing power grid in each circuit area in accordance with the overall power grid density. For example, select one of the regions in FIG. 4 one by one, then determine the number of the metallic layers, the number and the width of the power supply line of the power grid disposed in the region according to the overall power grid density of the selected region (obtained from step S170), and apply the determined power supply line configuration in the selected region. Therefore, the present invention can minimize the power grid area to save the chip area in accordance with the precondition of the voltage drop specification between the power pin and the power consuming module.

Note in particular that, each power consuming module is firstly analyzed separately and obtains the power grid density individually in the above embodiment, then overlay the analysis results to get the overall power grid density of each region in the circuit area. However, those skilled in the art can get the overall power grid density of each region in circuit area by other methods within the spirit of the invention. For example, in the step of dividing the circuit area into a plurality of regions in accordance with the position of representative point(s) and power pin(s), all the power consuming modules and all the power pins can be considered simultaneously, that is, the circuit area is divided into smaller regions in accordance with all the power consumable modules and power pins directly. Next, analyze the smaller region to get the simultaneous equations, then calculate the simultaneous equations and select one set of solutions according to the program condition and the determined condition parameters, then, further get the overall power grid density of each region. Thus, the overall power grid density of each region can be obtained directly; it is not necessary to first get the overall power grid density before getting the power grid density in accordance with the power grid density of each region as the above embodiment described.

In summary, the present invention of the automatic power grid synthesis method at least has the following advantages:

(1) First calculate the power grid density of each region in advance to synthesize the power grid in each circuit area in accordance with the overall power grid density, so that the power grid with only necessary area can be synthesized in accordance with design and floor plan. And, the power grid area of the small power consumption region can be further saved than the known methods.

(2) The overall power grid density of each region can be calculated automatically by computer and the power grid can be synthesized in accordance with the design specification, so that the design process of circuit can be accelerated.

(3) The power grid can be synthesized automatically in accordance with the design specification (that is so called design-dependent and floor-plan-dependent), so that the synthesized power grid can suit the design requirement.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An automatic power grid synthesis method for synthesizing power grid in a circuit area, wherein the circuit area has at least one power consuming module and at least one power pin, and the automatic power grid synthesis method includes:
   selecting at least one representative point in each power consuming module;
   dividing the circuit area into a plurality of regions in accordance with positions of each representative point and each power pin;
   calculating overall power grid density of each region in accordance with the positions of each power pin and each power consumption or current requirement at each representative point; and
   synthesizing the power grid in each region according to overall power grid density of the region, wherein the step of calculating overall power grid density of each region in accordance with the positions of each power pin and each representative point includes:
      calculating a power grid density between each power pin and each representative point; and
      calculating overall power grid density between each power pin and each representative point of each region in accordance with the power grid density, wherein the step of calculating the power grid density between each power pin and each representative point includes, for each representative point:
         calculating a pair of simultaneous equations:

$$I_m = \sum_{j=1}^{n} I_j, \text{ and}$$

$$I_1 R_1 = I_2 R_2 = \ldots = I_n R_n = \alpha V_{DD},$$

wherein $I_m$ is overall consumption current of the power consuming module, $I_j$ is the current through the jth power pin, n is an integer number greater than 0, $R_n$ is the resistance between the nth power pin and the representative point, $V_{DD}$ is the voltage of the power pin, and $\alpha$ is the voltage-drop quotiety of the nth power pin to the representative point whereof;
         selecting one solution set from a plurality of solution sets of the above simultaneous equations to get the resistance between each power pin and the representative point; and
         calculating the power grid density between each power pin and the representative point according to the resistance between each power pin and the representative point.

2. The automatic power grid synthesis method as claimed in claim 1, wherein one of the at least one representative point is a center point of the power consuming module.

3. The automatic power grid synthesis method as claimed in claim 1, wherein one of the at least one representative point is a most power-consuming position in the power consuming module.

4. The automatic power grid synthesis method as claimed in claim 1, wherein the power grid density between each power pin and the representative point is the reciprocal of the resistance between each power pin and the representative point.

5. The automatic power grid synthesis method as claimed in claim 1, further includes:
   setting up at least one condition parameter;
   wherein the step of selecting one solution set from the plurality of solution sets comprising performing linear programming to select one set of solutions according to the condition parameter.

6. The automatic power grid synthesis method as claimed in claim 1, wherein the step of calculating overall power grid density of each region includes:
   selecting each region one by one; and
   calculating the power grid density by a corresponding current path from each power pin to each representative point passing through the selected region to get the overall power grid density of the selected region.

7. The automatic power grid synthesis method as claimed in claim 1, wherein the step of synthesizing power grid in each circuit region includes:
   selecting each region one by one;
   determining the number of material layers, the width and number of power lines in the selected region according to the overall power grid density of the selected region; and
   disposing the determined power line in the selected region.

8. A computer readable recording medium for storing a program used for synthesizing a power grid in a circuit area which includes at least one power consuming module and at least one power pin, the program comprising sets of instructions for:
   reading a chip file, comprising the circuit area, each power consuming module and each power pin;
   selecting at least one representative point in each power consuming module;
   dividing the circuit area into a plurality of regions according to positions of each representative point and each power pin;
   calculating overall power grid density of the each region in accordance with each power pin and each representative point; and
   synthesizing the power grid in each region in accordance with the overall power grid density of the region, wherein the instruction for calculating overall power grid density of each region in accordance with each power pin and each representative point includes:
      calculating a power grid density between each power pin and each representative point; and
      calculating overall power grid density between each power pin and each representative point of each region in accordance with the power grid density, wherein the instruction for calculating the power grid density between each power pin and each representative point include, for each representative point:
         calculating a pair of simultaneous equations:

$$I_m = \sum_{j=1}^{n} I_j, \text{ and}$$

$$I_1 R_1 = I_2 R_2 = \ldots = I_n R_n = \alpha V_{DD},$$

wherein $I_m$ is the overall consumption current of the power consuming module, $I_j$ is the current through the jth power pin, n is a integer number greater than 0, $R_n$ is the resistance between the nth power pin and the representative point, $V_{DD}$ is the voltage of the power pin, and α is the voltage-drop quotiety of the nth power pin to the representative point;

selecting one solution set from a plurality of solution sets of the above simultaneous equations to get the resistance between each power pin and the representative point; and calculating the resistance between each power pin and the representative point, to get the power grid density of each power pin to the representative point.

9. The computer readable recording medium as claimed in claim 8, wherein one of the at least one representative point is a center point of the power consuming module.

10. The computer readable recording medium as claimed in claim 8, wherein one of the at least one representative point is a most power-consuming position in the power consumable module.

11. The computer readable recording medium as claimed in claim 8, wherein the instruction for calculating overall power grid density of each region in accordance with each power pin and each representative point includes:

calculating a power grid density between each power pin and each representative point; and calculating the overall power grid density between each power pin and each representative point of each region in accordance with the power grid density.

12. The computer readable recording medium as claimed in claim 8, wherein the program further includes the following instructions:

setting up at least one condition parameter;

wherein the instruction for selecting one solution set from the plurality of solution sets comprising performing linear programming to select one set of solutions according to the condition parameter.

13. The computer readable recording medium as claimed in claim 11, wherein the instruction for calculating the overall power grid density of each region includes:

selecting each region one by one; and calculating the power grid density by a corresponding current path from each power pin to each representative point passing through the selected region to get the overall power grid density of the selected region.

14. The computer readable recording medium as claimed in claim 8, wherein the instruction for synthesizing the power grid in each circuit area includes:

selecting each region one by one;

determining the number of material layers, the width and number of the power line in the selected region according to the overall power grid density of the selected region; and disposing the determined power line in the selected region.

15. An automatic power grid synthesis method for synthesizing power grid in a circuit area, wherein the circuit area has at least one power consuming module and at least one power pin, and the automatic power grid synthesis method includes:

selecting at least one representative point in each power consuming module;

dividing the circuit area into a plurality of regions in accordance with positions of each representative point and each power pin;

for each representative point, calculating a pair of simultaneous equations:

$$I_m = \sum_{j=1}^{n} I_j, \text{ and } I_1 R_1 = I_2 R_2 = \ldots = I_n R_n = \alpha V_{DD},$$

wherein, $I_m$ is overall consumption current of the power consuming module; $I_j$ is the current through the jth power pin; n is an integer number greater than 0; $R_n$ is the resistance between the nth power pin and the representative point; $V_{DD}$ is the voltage of the power pin; and α is the voltage-drop quotiety of the nth power pin to the representative point whereof;

selecting one solution set from a plurality of solution sets of the above simultaneous equations to get the resistance between each power pin and the representative point; and calculating the power grid density between each power pin and the representative point according to the resistance between each power pin and the representative point; and synthesizing the power grid in each region according to overall power grid density of the region.

* * * * *